Dec. 2, 1924.

F. OAKLEY ET AL

CLIP FOR SUSPENDERS

Filed Jan. 23, 1924

1,518,101

INVENTORS,
F. OAKLEY,
G. W. GIBBS,

BY

ATTORNEY

Patented Dec. 2, 1924.

1,518,101

UNITED STATES PATENT OFFICE.

FREDERICK OAKLEY, OF THORNTON HEATH, AND GEORGE WILLIAM GIBBS, OF NORBURY, ENGLAND.

CLIP FOR SUSPENDERS.

Application filed January 23, 1924. Serial No. 688,055.

*To all whom it may concern:*

Be it known that we, FREDERICK OAKLEY and GEORGE WILLIAM GIBBS, both British subjects, residing at 33 Norbury Road, Thornton Heath, Surrey, England, and 77 Melrose Avenue, Norbury, Surrey, England, have invented certain new and useful Improvements in Clips for Suspenders, of which the following is a specification.

This invention relates to an improved clip for ladies' suspenders and is intended to be used for the attachment of the suspender strap to the corset.

According to the invention in its broadest form, the clip comprises a pair of jaws, resilient means for opening said jaws and a closing screw for closing the said jaws against the action of the said resilient opening means.

According to the invention the clip comprises an elastic metal strip folded generally to a V-shape, the angle of the V being approximately cylindrical to house the arm of a safety-pin or shackle to which the suspender strap can be attached by sewing. The ends of the V are bent towards each other to form gripping edges which may be serrated or provided with a rubber fitting to improve the grip. Normally, the arms of the clip tend to spring apart but they are adapted to be forcibly held together by means of a screwed pin extending from the inside of one arm of the clip through the other arm and a screwed nut or collar mounted on the free end of the pin, and adapted when screwed up to force the two arms of the clip together. Preferably the screwed pin has a plain head at its free end to prevent loss of the nut when in use and the upper or outer face of the nut is recessed to accommodate the said head, so that only part of the surface of the pin and of the inner wall of the collar is threaded. The collar is preferably formed with an extended bearing surface engaging with the face of the clip.

The preferred form of the invention is illustrated in the accompanying drawing in which—

Figure 1:
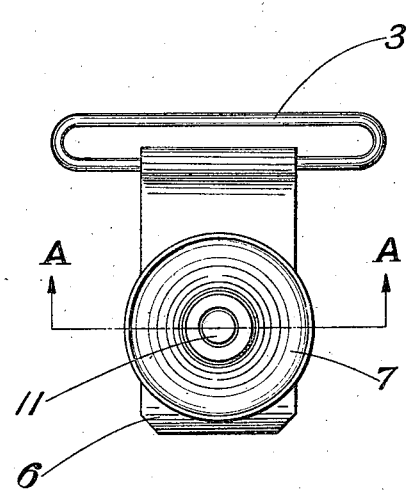
Figure 2:
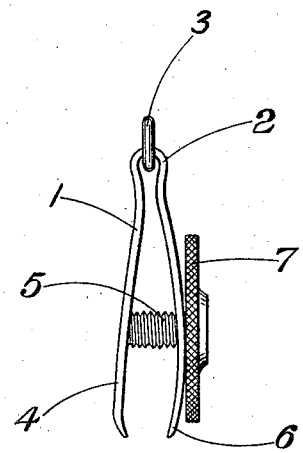
Figure 3:
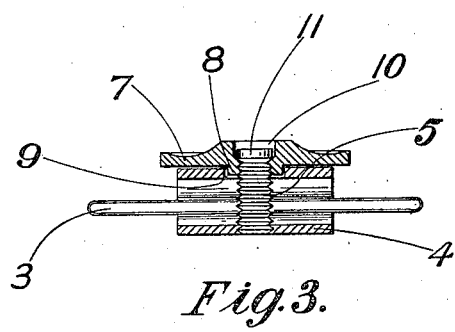

Fig. 1 shows a front view,
Fig. 2 a side view, and
Fig. 3 a section on the line A—A of Fig. 1.

Referring now to the drawing, the device here illustrated comprises an elastic metal strip 1, folded generally to a V-shape, as shown, the angle 2 of the V, being rounded to house the arm of a shackle 3. The lower jaw 4 of the clip is provided with a threaded pin 5 extending upwardly through a hole in the upper jaw 6, a screwed collar 7 being mounted on the pin above the upper jaw 6 for the purpose of engaging the jaws together.

In the form shown, the collar 7 is formed with a boss 8 adapted to be seated within the hole 9 of the upper jaw 6, and has an extended lower bearing surface so as to engage the whole width of the said jaw when in the operative position to provide adequate bearing and to allow the rim to project beyond the edges of the jaw so as to facilitate operation. The screwed hole of the collar 7 is enlarged at its upper part 10 and the free end of the screwed pin has an enlarged end 11 adapted to be seated in the recess 10 so as to prevent the collar being completely withdrawn from the pin.

In assembling the device the screwed collar is mounted on the pin from the lower end before the latter is mounted on the clip, the pin being thereafter passed through the hole 9 into its seating in the lower jaw 4 and there attached by expanding by means of a punch.

We claim:—

In a suspender clip, inherently resilient jaws, a hole in one of said jaws, a threaded pin, an operating collar on said pin having a threaded connection with one end of said pin, the pin being enlarged beyond its threaded connection with the collar so that the collar cannot be detached from the pin, the pin being passed through the hole with its opposite end secured to the other of said jaws, the diameter of the collar being greater than the width of the clip.

In testimony whereof we affix our signatures.

FREDERICK OAKLEY.
GEORGE WILLIAM GIBBS.